United States Patent Office

3,381,056
Patented Apr. 30, 1968

3,381,056
POLYBLENDS COMPRISING A VINYL CHLORIDE GRAFT COPOLYMER, A POLYESTER URETHANE ELASTOMER AND VINYL POLYMER
Ludwig A. Beer, Agawam, Mass., assignor to Monsanto Company, St. Louis, Mo., a corporation of Delaware
No Drawing. Filed Aug. 23, 1965, Ser. No. 481,931
13 Claims. (Cl. 260—859)

ABSTRACT OF THE DISCLOSURE

Blended compositions may be prepared from 40–97% by weight of a graft copolymer of at least 50% vinyl halide monomer and up to 50% by weight of another monomer copolymerizable therewith in the presence of 4–20% of a polymer selected from chlorinated polyethylene, chlorinated ethylene-propylene copolymers, and copolymers of ethylene with vinyl acetate, vinyl chloride or ethyl acrylate; 3–20% by weight of a polyester urethane prepared by reacting 100 parts of a polyester with a diol and a diisocyanate; and 0–57% vinyl chloride polymer.

---

This invention relates to polyblend resins of the vinyl halide type having improved physical characteristics.

Vinyl halide resins such as vinyl chloride, vinylidene chloride and the like have been found suitable when present in the appropriate proportions for the manufacture of rigid articles such as bottles, sheets, film, pipe, gutter spouts, siding and numerous other structural articles. Specific emphasis for these products is being placed in the field of blown bottleware, and structural products such as house siding, rain gutters and the like.

Polyvinyl chloride homopolymer is generally not acceptable for structural applications mainly due to its low impact strength, but is highly touted for its inertness to the action of other chemicals. In rigid structural materials such as those set forth, good physical properties are critical to the success of the structural articles. Vinyl compounds are especially suited for structural usage because of good weathering properties, but as stated above, polyvinyl chloride, per se is physically deficient due to low impact strength. Numerous attempts have been made to improve the physical characteristics of vinyl halide resin compositions to render them suitable for plastic bottles, films, sheets, and other structurally oriented articles. Substantial emphasis has been placed on the development of a vinyl compound having good impact strength, clarity and weatherability. To date, no solution has been conceived for simultaneously acquiring optimum results for each of these properties, but much has been done to optimize the combination. In other words, where one composition excels in impact strength, its weatherability and/or clarity are deficient.

One development in rigid plastics is physical mixtures of vinyl chloride polymers or copolymers of vinyl chloride monomers and other ethylenically unsaturated monomers with chlorinated olefins such as chlorinated polyethylene. Exemplary of such a mixture is the Frey et al. Patent 3,006,889, which teaches physical mixtures of polyvinyl chloride and copolymers thereof with chlorinated polyethylene within certain proportions. Similarly, the Hankey et al. Patent 3,145,187, teaches the addition of a surfactant to polyvinyl chloride-chlorinated polyethylene physical mixtures in the composition ranges where the chlorinated polyethylene is incompatible with polyvinyl chloride.

Paralleling the physical mixtures of polyvinyl chloride and other components, polymerization of the vinyl chloride monomer or vinyl monomer in the presence of chlorinated polyethylene or other polymers or copolymers have been shown to provide graft polymer compositions having superior physical characteristics to those of the corresponding physical mixtures. In any event, both the physical mixtures and the graft polymers do improve the physical characteristics of the composition over that polyvinyl chloride, per se. Accordingly, these compositions have been deemed somewhat suitable for applications similar to those for which the present invention is directed.

Further attempts have been made to improve the physical characteristics of the resinous compositions by providing physical mixtures of polyvinyl chloride and/or copolymers with various graft polymerization end products. Exemplary achievements are the Hayes Patent 2,802,809, the Heaps et al. Patent 3,167,598 and the Fedderson Patent 2,889,308. Still further, Patent 3,053,800 to Grabowski teaches blends of polyvinyl chloride and acrylonitrile, butadiene, styrene graft copolymers and copolymers of acrylonitrile styrene and alpha methyl styrene.

All of the above patents contain teachings of specific resinous compositions characteristic of having improved physical characteristics over those of polyvinyl chloride, per se, and all of which are somewhat useful in application for the production of structural plastic items. These compositions afford improved impact strength, tensile strength and heat stability to the final product made from the composition. Noteworthy, however, is the fact that while blends of polyvinyl chloride homopolymer or vinyl chloride copolymers with graft copolymers such as polyvinyl chloride-chlorinated polyethylene provide compositions of enhanced impact strength, they are somewhat deficient in light transmittance.

It is therefore an object of this invention to provide a vinyl halide composition that has enhanced impact strength and clarity.

Another object of this invention is to provide a superior vinyl halide composition suitable for blown bottleware.

Still another object of this invention is to provide a vinyl halide composition that is suitable for formation of structural products designed for outside use.

These and other objects will become more apparent from the following detailed discussion of the present invention.

The present invention is yet a further step in the development of rigid vinyl halide compositions having mainly improved impact strength, weatherability and clarity. The resinous compositions of the present invention are suitable for extrusion, calendering, injecting molding, below molding, vacuum forming, or compression molding to produce items such as pipe, gutter spouts, siding, plastic bottles, films, sheets, as well as numerous other shaped plastic articles.

The present invention is generally directed to a novel blend of (A) a graft copolymer resin obtained by polymerizing vinyl chloride alone or mixed with a suitable monomer copolymerizable therewith in the presence of an ethylene polymer; (B) a polyester urethane elastomer; and (C) a polymer having incorporated therein at least 70 percent vinyl chloride.

Constituent (A) is a graft copolymer prepared by polymerizing vinyl chloride monomer or a mixture of comonomers including at least 50 percent vinyl chloride and a monomer copolymerizable therewith in the presence of 4 to 20 percent of an ethylene polymer of the type described below.

Numerous monomers are suitably copolymerizable with vinyl chloride in the preparation of the constituents (A) or (C). While the group from which these monomers is obtained is not so specifically limited, vinyl acetate, vinyl laurate, alkyl acrylates, alkyl methacrylates, alkyl maleates, alkyl fumarates, vinylidene chloride, acrylonitrile, vinyl cetyl ether, vinyl lauryl ether and vinyl myristyl ether are suitable.

The ethylene polymer or backbone polymer, in the preparation of constituent (A) is generally a chlorinated ethylene polymer but is not so limited. Both chlorinated high and low density polyethylenes are suitable. Further, the chlorinated polyethylene may have been homogeneously chlorinated in the dry, dispersed or dissolved state, and additionally may have been chlorinated in the presence or absence of solvents or swelling agents. The chlorination reaction may be activated by heat, light, or free radical initiators. The chlorinated polyethylene may also be cross-linked or uncross-linked and the compounds preferably contain a chlorine content in the range of 20–45% by weight.

A second suitable ethylene polymer is a copolymer of ethylene and propylene that is chlorinated in the same ways as the polyethylene. The chlorinated copolymer of ethylene and propylene also preferably contains 20–45% by weight of chlorine.

A copolymer of ethylene and vinyl acetate is a further trunk polymer onto which the polyvinyl chloride or copolymers thereof may be grafted. The ethylene/vinyl acetate copolymer may be uncross-linked or slightly cross-linked and preferably contains vinyl acetate in the range of 30–75% by weight.

A copolymer of ethylene and vinyl chloride is another example of a suitable backbone polymer for the preparation of constituent (A). The ethylene/vinyl chloride copolymers may be uncross-linked or slightly cross-linked and preferably should contain from about 30–75% by weight of vinyl chloride.

Still further, another example of a suitable ethylene trunk polymer is a copolymer of ethylene and ethyl acrylate preferably having an ethyl acrylate content of 20–65% by weight.

The solid polyester urethane elastomers, constituent (B), used in the practice of this invention are generally prepared by reacting linear or substantially linear polyesters with an excess of an organic di-isocyanate compound and a diol. Particularly suitable polyesters are prepared from glycols such as ethylene glycol and aliphatic polyethylene dicarboxylic acids such as adipic acid and with hydroxyl groups ranging between 0.6 to 2.4%.

As dihydric alcohols, there may be mentioned ethylene, glycol, 1,2-propylene glycol, 1,3-butylene glycol, 1,4-butanediol, 1,6-hexanediol, methyl hexane 1,6-diol, 1,4-butanediol, diethylene glycol, thiodiglycol, 2,2-dimethyl-1,3-propylene glycol, and the like. As aliphatic acids, there may be mentioned malonic, succinic, adipic, methyladipic, maleic, dihydromuconic, sebacic, suberic and the like.

As examples of di-isocyanates, there may be mentioned tetramethylene di-isocyanate, pentamethylene di-isocyanate, hexamethylene di-isocyanate, decamethylene di-isocyanate, thiodipropyl di-isocyanate, p,p'-diphenyl methane di-isocyanate, meta-xylylene di-isocyanate, benzidine di-isocyanate, phenylene di-isocyanate, chlorophenylene di-isocyanate, tolylene di-isocyanate, napthylene di-isocyanate, and the like. A particularly preferred di-isocyanate compound is 4,4'-diphenylmethane di-isocyanate.

Constituent (C) may be vinyl chloride homopolymer or a vinyl chloride copolymer of at least 70 percent vinyl chloride and some other monomer copolymerizable therewith. Suitable comonomers include, but are not limited to, vinyl acetate, vinyl laurate, alkyl acrylates, alkyl methacrylates, alkyl maleates, alkyl fumarates, vinylidene chloride, acrylonitrile, vinyl lauryl ether and vinyl myristyl ether.

While very broad ranges of mixtures of constituents (A), (B) and (C) provide improved polyvinyl chloride compositions, the preferred ranges reside in the areas within the sum of constituent (A) and (C) ranges from about 89 to about 97% by weight of the total compositions and where the sum of constituents (A) and (B) represent from about 50 to about 100% by weight of the total compositions. Furthermore, individual preferred ranges of the various constituents include (A) in the range of from about 40 to about 97%; (B) from about 3 to about 20% and (C) from about 0 to about 57% by weight of the total compositions.

The polyvinyl chloride graft copolymers of constituent (A) may be prepared as described in copending application Ser. No. 204,031, filed June 21, 1962. Such process teaches the polymerization of a vinyl chloride monomer in the presence of various amounts of chlorinated polyethylene preferably in aqueous suspension wherein the reaction was initiated by a peroxidic initiator. Chlorinated polyethylene is substantially dissolved in the vinyl chloride monomer, lauroyl peroxide is added and the polymerization allowed to proceed at temperatures of 25–80° C., and preferably, 45–65° C., until a pressure drop indicates at least 80% monomer conversion.

For a better understanding of the present invention, the following examples and comparative tables are included. These examples are not to be construed as limiting the present invention, but are only evidence of the results obtained by practice of the present invention and are indicative of operating conditions under which the composition of the present invention are prepared. Unless otherwise indicated, parts are by weight.

Example I

A polyvinyl chloride graft copolymer resin was obtained by polymerizing 90 parts of vinyl chloride monomer in the presence of 7 parts of chlorinated polyethylene (24% chlorine, intrinsic viscosity of 0.78). The reaction proceeded at 57° C. using a lauroyl peroxide catalyst yielding a resin having a specific viscosity of 0.43 (0.42% in cyclohexanone). Two parts of a tin mercaptide stabilizer and 0.5 part of stearic acid (lubricant) were then added to the graft resin and the mixture was milled on a two-roll mill at 170° C. After 10 minutes of milling, a ⅛ inch thick sheet was drawn off and test samples measuring 5 inches x ½ inch x ⅛ inch were prepared from the milled sheet and the impact strength tested as set forth in ASTM D–256–56. A 25 mil thick, press-polished sheet was used for determination of haziness on a GE spectrophotometer by light transmittance at 550 millimicrons wavelength (ASTM D–1003–52).

The aforedescribed samples were analyzed and the data set forth in Table I.

Example II

A polyester urethane elastomer was prepared as follows. Ethylene glycol was reacted with a stoichiometric excess of adipic acid to produce a corresponding polyester having free hydroxyl groups attached thereto and a molecular weight of 2000. One hundred parts of this polyester was mixed with 9 parts of 1,4-butanediol and 40 parts of 4,4-diphenylmethane-di-isocyanate, and vigorously stirred for one minute at 75° C. to produce the polyester urethane elastomer. (Specific gravity of 1.25; ultimate tensile strength of 5500 p.s.i. and total elongation of 600%.) A physical mixture was then prepared from 50 parts of the graft copolymer of Example I; 5 parts of the herein described polyester urethane elastomer; and 45 parts of a polyvinyl chloride suspension resin having a specific viscosity of 0.48. This mixture was then intimately fuse blended on a two-roll mill and samples prepared and analyzed as set forth in Example I. Results of the analyses appear in Table I. This composition is a teaching of the present invention.

Example III

A physical blend prepared from 90 parts of polyvinyl chloride and 10 parts of the polyester urethane elastomer of Example II was blended, sampled and analyzed according to the procedures set forth in Example I. Results of the analyses appear in Table I.

Example IV

Ninety parts of vinyl chloride monomer were polymerized in the presence of 10 parts of an ethylene-vinyl chloride copolymer (30% microgel, specific viscosity of 0.13 at 25° C. as measured as a 0.1% solution in tetrahydrofurane). The polymerization was conducted at 53° C. with the aid of a di-isopropyl percarbonate initiator and yielded a graft copolymer resin having a specific viscosity of 0.52 (0.42 percent solution in cyclohexane). This graft resin was blended, sampled and analyzed according to the procedures prescribed for Example I. Data are tabulated in Table I.

Example V

Eleven mols of ethylene glycol were reacted with 10 mols of adipic acid to produce a polyester having a molecular weight of 2000 and a hydroxyl number of 56. One hundred parts of this polyester were then interacted with 2.6 parts of an isomeric mixture of 80 percent 2,4-tolylene di-isocyanate and 20 percent 2,6-tolylene di-isocyanate; and 19 parts of 1,4-phenylene bis(B-hydroxyethyl ether).

Five parts of the polyester urethane elastomer thus formed were mixed with 50 parts of the polyvinyl chloride-ethylene-vinyl chloride graft copolymer of Example IV and 45 parts of a vinyl chloride-vinyl lauryl ether copolymer (96:4) having a specific viscosity of 0.29. This mechanical mixture was then fusion blended on a two-roll mill, sampled and analyzed as directed in Example I. Results of the analyses appear in Table I. This composition is a teaching of the present invention.

Example VI

A physical mixture was prepared from 90 parts of a vinyl chloride-vinyl lauryl ether copolymer (96:4) having a specific viscosity of 0.29 and 10 parts of the polyester urethane elastomer of Example V. This mixture was fusion blended, sampled and analyzed according to the prescribed procedures of Example I. Results of the analyses are tabulated in Table I.

TABLE I

| Examples | I | II | III | IV | V | VI |
|---|---|---|---|---|---|---|
| Izod Impact, ft./lb./in. (ASTM D-256–56) | 18.6 | 15.9 | 14.8 | 4.8 | 14.2 | 2.6 |
| Percent Haze-light transmittance at 550 mm. (ASTM D-1003–52) | 76.2 | 12.0 | 28.4 | 9.7 | 10.2 | 12.4 |

As herein stated before, no one has yet discovered the composition wherein both impact strength and clarity (percent haze) are optimum. The present invention has, however, approached this point. A review of the data tabulated in Table I shows the composition taught by the present invention, Examples II and V, to be superior to the compositions of the other examples. True, in isolated cases one of the criteria, either impact strength or clarity of the comparative compositions may be superior to compositions of the present invention, but in such isolated instances, the other criteria is by far inferior. The data for the compositions of the present invention are therefore evidence of the present attainment of excellent impact and clarity. Both criteria are always in the acceptable range for the compositions of the present invention.

The compositions of the present invention are extremely suited for blow molding of bottleware and extrusion or injection molding of rigid structural items intended for exterior use. Thus, the compositions of the present invention also possess good weathering properties, i.e., they are not adversely affected by exposure to the natural elements. Rain gutters, catch pots, spouts, etc. are therefore good examples of structural products that may be manufactured from the compositions of the present invention. When structural products are manufactured, however, they are very seldom clear, and it is thus quite foreseeable that pigments, lubricants and/or processing aids may be added to the compositions of the present invention.

It is obvious that many variations may be made in the compositions described above without departing from the spirit and scope of this invention as defined in the appended claims.

What is claimed is:

1. A vinyl chloride polyblend composition comprising a mixture of:

Percent by wt. of total mixture
A. Vinyl chloride graft copolymer _____ 40–97
B. Polyester urethane elastomer _____ 3–20
C. Vinyl chloride polymer _____ 0–57 where: $A+C=89-97\%$ and $A+B=43-100\%$ and where

A is a graft copolymer prepared by polymerization of at least about 50% vinyl halide monomer plus up to 50% of a different ethylenically unsaturated monomer copolymerizable therewith in the presence of 4–20% of an ethylene polymer;

B is a polyester urethane elastomer prepared by reacting a polyester with a di-isocyanate and a diol; and C is a vinyl halide polymer selected from the group consisting of polyvinyl chloride and copolymers of vinyl chloride and other ethylenically unsaturated monomers copolymerizable therewith characterized in that the monomer mixture contains at least 70% vinyl chloride monomer.

2. The composition of claim 1 wherein:
A is a graft copolymer prepared by polymerizing a mixture of vinyl chloride monomer and up to 50% of a monomer copolymerizable therewith in the presence of 4–20% of an uncross-linked chlorinated polyethylene having a chlorine content of 20–45%.

3. The composition of claim 1 wherein:
A is a vinyl halide resin obtained by the polymerization of a vinyl chloride monomer and up to 50% of a monomer copolymerizable therewith in the presence of 4–20% of an ethylene/vinyl acetate copolymer having a vinyl acetate content of from about 30 to about 75%.

4. The composition of claim 1 wherein:
A is a vinyl halide resin obtained by the polymerization of a vinyl chloride monomer and up to 50% of a monomer copolymerizable therewith in the presence of 4–20% of an uncross-linked chlorinated ethylene/propylene copolymer having a chlorine content of 20–45%.

5. The composition of claim 1 wherein:
A is a vinyl halide resin obtained by the polymerization of a vinyl chloride monomer and up to 50% of a monomer copolymerizable therewith in the presence of 4–20% of an ethylene/vinyl chloride copolymer having a chlorine content of from about 35 to about 75%.

6. The composition of claim 1 wherein:
A is a vinyl halide resin obtained by the polymerization of a vinyl chloride monomer and up to 50% of a monomer copolymerizable therewith in the presence of 4–20% of an ethylene/ethyl acrylate copolymer having an ethyl acrylate content of from about 20 to about 65%.

7. A rigid vinyl chloride polyblend composition comprising a mixture of:

Percent by wt. of total mixture
A. Vinyl chloride graft copolymer _____ 40–97
B. Polyester urethane elastomer _____ 3–20
C. Vinyl chloride polymer _____ 0–57 where:

A is a graft copolymer prepared by polymerization of at least about 50% vinyl halide monomer and up to 50% of a different ethylenically unsaturated monomer copolymerizable therewith in the presence of 4–

20% of a compound selected from the group consisting of chlorinated polyethylene, a chlorinated ethylene/propylene copolymer, a copolymer of ethylene and vinyl acetate, a copolymer of ethylene and vinyl chloride, and a copolymer of ethylene and ethyl acrylate;

B is polyester urethane elastomer prepared by reacting 100 parts of preformed polyester with 9 parts of 1,4-butanediol and 40 parts of 4,4-diphenyl methane-di-isocyanate; and C is a vinyl halide polymer selected from the group consisting of polyvinyl chloride and copolymers of vinyl chloride and other ethylenically unsaturated monomers copolymerizable therewith, characterized in that the monomer mixture contains at least 70% vinyl chloride monomer.

8. A rigid vinyl chloride fusion blend comprising:
(a) 50 parts of a graft copolymer prepared by polymerizing 90 parts of vinyl chloride monomer in the presence of 10 parts chlorinated polyethylene;
(b) 5 parts of a polyester urethane elastomer prepared by reacting 11 mols of ethylene glycol and 10 mols of adipic acid to yield a polyester and interacting 100 parts of said polyester with 9 parts of 1,4-butanediol and 40 parts of 4,4-diphenyl-methane di-isocyanate; and
(c) 45 parts of polyvinyl chloride.

9. A rigid vinyl chloride fusion blend comprising:
(a) 50 parts of a graft copolymer prepared by polymerizing 90 parts of vinyl chloride monomer in the presence of 10 parts of a copolymer of 45.6 parts ethylene and 54.4 parts vinyl chloride;
(b) 5 parts of a polyester urethane elastomer prepared by reacting 100 parts of a polyester prepared from 11 mols of ethylene glycol and 10 mols of adipic acid; 26 parts of an isomeric mixture of 2,4-tolylene di-isocyanate and 2,6-tolylene di-isocyanate, and 19 parts of 1,4-phenylene bis (B-hydroxyethyl ether); and
(c) 45 parts of a copolymer prepared from 96 parts of vinyl chloride and 4 parts of vinyl lauryl ether.

10. A vinyl chloride polyblend composition comprising:
(a) 40–97% of a graft copolymer prepared by polymerization of a member selected from the group consisting of vinyl chloride monomer and a vinyl chloride monomer mixed with other monomers copolymerizable therewith, in the presence of a member selected from the group consisting of chlorinated polyethylene, copolymers of ethylene and propylene, copolymers of ethylene and vinyl chloride, copolymers of ethylene and vinyl acetate, and copolymers of ethylene and ethyl acrylate.
(b) 3–20% by weight of a polyester urethane elastomer prepared by reacting a linear polyester prepolymer with an excessive amount of an organic di-isocyanate compound and a diol; and
(c) 0–57% of a polymer selected from the group consisting of homopolymers of polyvinyl chloride and copolymers of vinyl chloride and other monomers copolymerizable therewith.

11. A blow molded article having a composition as defined in claim 1.

12. An extruded article having a composition as defined in claim 1.

13. An injection molded article having a composition as defined in claim 1.

References Cited

UNITED STATES PATENTS

| | | | |
|---|---|---|---|
| 3,267,091 | 8/1966 | Landler | 260—859 |
| 3,294,711 | 12/1966 | Bonin | 260—859 |

MURRAY TILLMAN, *Primary Examiner.*

P. LIEBERMAN, *Assistant Examiner.*

UNITED STATES PATENT OFFICE
CERTIFICATE OF CORRECTION

Patent No. 3,381,056 April 30, 1968

Ludwig A. Beer

It is certified that error appears in the above identified patent and that said Letters Patent are hereby corrected as shown below:

Column 2, line 47, "below molding" should read -- blow molding --.

Signed and sealed this 23rd day of December 1969.

(SEAL)
Attest:

Edward M. Fletcher, Jr.       WILLIAM E. SCHUYLER, JR.
Attesting Officer             Commissioner of Patents